United States Patent
Jose et al.

(10) Patent No.: US 9,143,890 B2
(45) Date of Patent: Sep. 22, 2015

(54) NETWORK, MASTER, HUB AND METHOD FOR PROVIDING A BLUETOOTH INFRASTRUCTURE

(71) Applicant: Samsung Electronics Co., Ltd., Gyeonggi-do (KR)

(72) Inventors: Jinesh Jose, Bangalore (IN); Siju Punnoose Cherian, Bangalore (IN)

(73) Assignee: Samsung Electronics Co., Ltd., Suwon-Si (KR)

( * ) Notice: Subject to any disclaimer, the term of this patent is extended or adjusted under 35 U.S.C. 154(b) by 105 days.

(21) Appl. No.: 13/941,194

(22) Filed: Jul. 12, 2013

(65) Prior Publication Data

US 2014/0018002 A1    Jan. 16, 2014

(30) Foreign Application Priority Data

Jul. 12, 2012    (IN) .............. 2839/CHE/2012

(51) Int. Cl.
*H04B 7/00*    (2006.01)
*H04W 4/00*    (2009.01)

(52) U.S. Cl.
CPC .................. *H04W 4/008* (2013.01)

(58) Field of Classification Search
CPC ..................................... H04W 4/008
USPC ................... 455/41.2, 90.2, 426.1
See application file for complete search history.

(56) References Cited

U.S. PATENT DOCUMENTS

| | | | |
|---|---|---|---|
| 7,532,594 B2 * | 5/2009 | Lin et al. .................. | 370/329 |
| 8,355,363 B2 * | 1/2013 | Brahmbhatt et al. ........ | 370/328 |
| 8,737,917 B2 * | 5/2014 | Desai et al. ................ | 455/41.2 |
| 2004/0136338 A1 | 7/2004 | Lin et al. | |
| 2005/0135275 A1 | 6/2005 | Hester et al. | |
| 2009/0232047 A1 | 9/2009 | Lynch, Jr. et al. | |

OTHER PUBLICATIONS

2011 Mobile Protocol and Platforms 40 on "System and Method to Create Bluetooth Infrastructure Mode Network for Smart Grids", Sep. 28, 2011, 8 pages.
Jain, et al. "Distributed, Robust and Self-Organizing Bluetooth Scatternet Formation", Jan. 2004, 12 pages.

\* cited by examiner

*Primary Examiner* — Tuan H Nguyen (57) ABSTRACT

An apparatus and method for providing a Bluetooth infrastructure. A master of a network for providing the Bluetooth infrastructure connects with at least one device via bidirectional Bluetooth communication. A hub of the network connects between the at least one device and the master via the bidirectional Bluetooth communication.

17 Claims, 8 Drawing Sheets

NETWORK, MASTER, HUB AND METHOD FOR PROVIDING A BLUETOOTH INFRASTRUCTURE

CROSS-REFERENCE TO RELATED APPLICATION(S) AND CLAIM OF PRIORITY

The present application is related to and claims priority under 35 U.S.C. §119(a) to a Indian Patent Application filed in the Indian Patent Office on Jul. 12, 2012 and assigned Serial No. 2839/CHE/2012, the contents of which is incorporated herein by reference.

TECHNICAL FIELD OF THE INVENTION

The present disclosure relates to a network for infrastructure, and more particularly relates to a network, apparatus and method for providing an infrastructure network by using Bluetooth communication.

BACKGROUND OF THE INVENTION

The electrical grid is a network providing last mile connectivity between electricity suppliers and the consumers. A smart grid is an example of an electrical grid. A smart grid generally refers to a class of technology used to bring utility electricity delivery systems into the 21st century, using computer-based remote control and automation. These modernized power networks are promoted by many governments across the globe as a way to address issues like global warming, emergency resilience, and so on. These systems are made possible by two-way communication technology and computer processing that has been used for decades in other industries. They are beginning to be used on electricity networks, from the power plants and wind farms all the way to the consumers of electricity in homes and businesses. Smart grids offer many benefits to utilities and consumers mostly seen in big improvements in energy efficiency on the electricity grid and in the energy users' homes and offices. These smart grids rely on a low-cost, low-power, wireless mesh network standard. Smart grids deliver electricity from supplier to consumers using two-way digital technology. This two way digital technology allow control of appliances at consumer homes to save energy, reduce cost and increase reliability.

Equally emerging wireless, inexpensive, low power, automatic technology is the Bluetooth which takes small-area networking to the next level by removing the need for user intervention, allowing faster data transfer. Wireless technology is a key component in the battle to improve the smart grid. Typical Bluetooth devices have a maximum range of only 10 to 100 meters, which currently restricts direct use of Bluetooth technology into smart grids. One possible way to overcome this issue is to increase Bluetooth radio power to extend the range, but it has the disadvantage of increased power consumption. Introducing Bluetooth technology into smart grids requires much less power consumption of the device and should have enough range to spread over grid area. Lower power consumption is possible with Bluetooth Low Energy (LE) technology, but obtaining the span of area which a grid spreads is quite difficult. Range could be extended by increasing the radio power which shall increase the power consumption.

Due to above mentioned reasons, it is evident that the existing system employing Bluetooth technology in an electricity grid may result in increased power consumption. Further, these systems enable the network connection spread only across a short range.

SUMMARY OF THE INVENTION

To address the above-discussed deficiencies of the prior art, an aspect of the present invention is to provide a network, a master, a hub and a method of providing Bluetooth infrastructure with extended range.

Another aspect of the present invention is to provide a network, a master, a hub and a method of extending a Bluetooth range without impacting the power consumption of individual Bluetooth devices The disclosure provides a network for providing a Bluetooth infrastructure. The network includes at least one device capable of performing bidirectional Bluetooth communication, a master connected with the at least one device by the bidirectional Bluetooth communication, and at least one hub connected between the at least one device and the master by the bidirectional Bluetooth communication.

The disclosure also provides a master of a network for providing a Bluetooth infrastructure. The master includes a Bluetooth communication module for providing a bidirectional Bluetooth communication to at least one device and at least one hub performing the bidirectional Bluetooth communication with the at least one device in the network, and a controller for searching for the at least one hub by a paging, and searching for the at least one device by a paging through at least one detected hub, and configuring the network.

The disclosure further provides a hub of a network for providing a Bluetooth infrastructure. The hub includes a Bluetooth communication module for providing a bidirectional Bluetooth communication to at least one device and a master of the network in the network, and a controller for searching for and pairing the at least one device by a paging according to a request of the master.

The disclosure still further provides a method of providing a Bluetooth infrastructure in a network. The method includes searching for at least one hub, which performs a bidirectional communication with the at least one device in the network, by paging, and searching for the at least one device by paging through the at least one detected hub, and configuring the network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein provide Bluetooth infrastructure for deployment in wider networks such as electrical grids without increasing radio power on Bluetooth devices. The Bluetooth infrastructure according to the embodiment of the disclosure includes a Central Control Unit (CCU) or the network master, which manages the network without manual intervention; hubs or non leaf nodes used as repeaters to extend the spread of the network; and slave devices or leaf nodes, which are low energy sensors connected to an immediate hub. The CCU can intelligently and automatically reconfigure nodes allowing free movement of leaf nodes in a network span. The Bluetooth infrastructure provides a feature of routing data from sensor to master in the shortest and most reliable path.

The electrical grid is a network providing last mile connectivity between electricity suppliers and the consumers.

In an embodiment, the electrical grid can be a smart grid that uses computers and other technology to gather and act on information, such as information about the behaviors of suppliers and consumers, in an automated fashion to improve the efficiency, reliability, economics, and sustainability of the production and distribution of electricity.

Throughout the description the term master and central control unit (CCU) is used interchangeably.

Referring now to the drawings, and more particularly to FIGS. 1 through 10, where similar reference characters denote corresponding features consistently throughout the figures, there are shown preferred embodiments.

Figure 1:
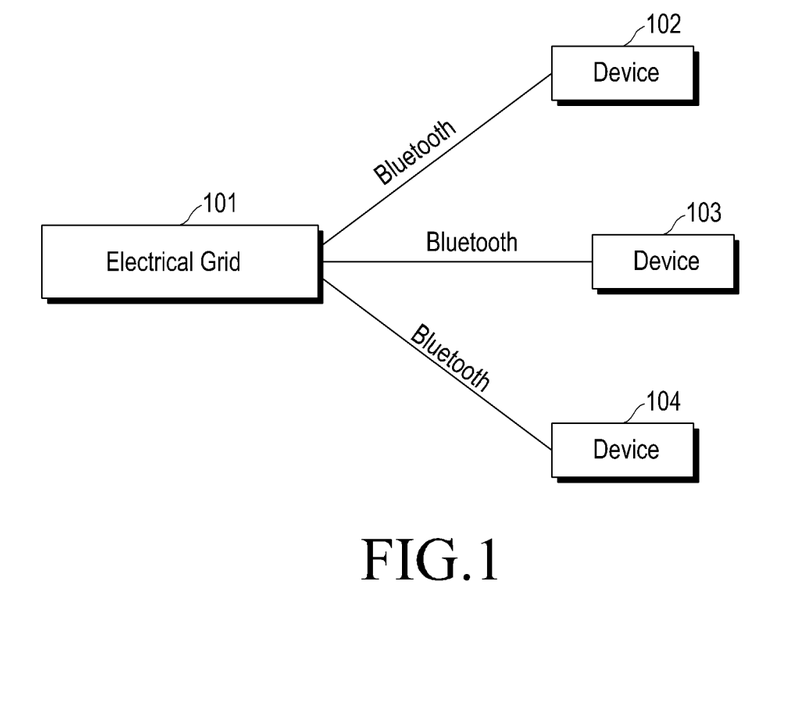
FIG. 1 illustrates a general block diagram of an electrical grid comprising a plurality of devices connected through Bluetooth, according to embodiments as disclosed herein.

FIG. 1 illustrates a general block diagram of an electricity grid comprising a plurality of devices connected through Bluetooth, according to embodiments as disclosed herein. As depicted in the figure, the electrical grid 101 is connected to a plurality of devices such as device 102, device 103, and device 104 through Bluetooth. The device 102, device 103, and device 104 connected to the electrical grid 101 can have sensors including but not limited to power meters, voltage sensors, and fault detectors to gather relevant parameters. In an embodiment, the devices can be washing machines, vacuum cleaners, refrigerators, and so on, connected to the electrical grid through Bluetooth. The devices are configured with a low energy sensor and these sensors transfer the data corresponding to the devices to the electrical grid 101. The electrical grid 101 network includes a Central Control Unit (CCU) which is also called a utility's network operations center. The CCU and the devices use bidirectional Bluetooth communication. The CCU retrieves several parameters from device 102, device 103, and device 104 while simultaneously keeping these devices updated with grid status. This two way digital communication enables sensing, measuring and controlling the devices in the electrical grid 101 networks to pass information in both directions from CCU to devices as well as from devices to CCU. For example, if necessary, the electrical grid can send messages to warn device users about a power surge detected in the network and instruct the users to temporarily switch off their devices until supporting generators start supplying power to the network. This enables gaining better stability in electrical grid 101 networks and prevents major disasters. This electrical grid 101 network uses automation technology that adjusts the CCU and controls each individual device from a central location, and enables a user to have continuous monitoring of their power consumption to manage their power or energy usage accordingly.

Figure 2:
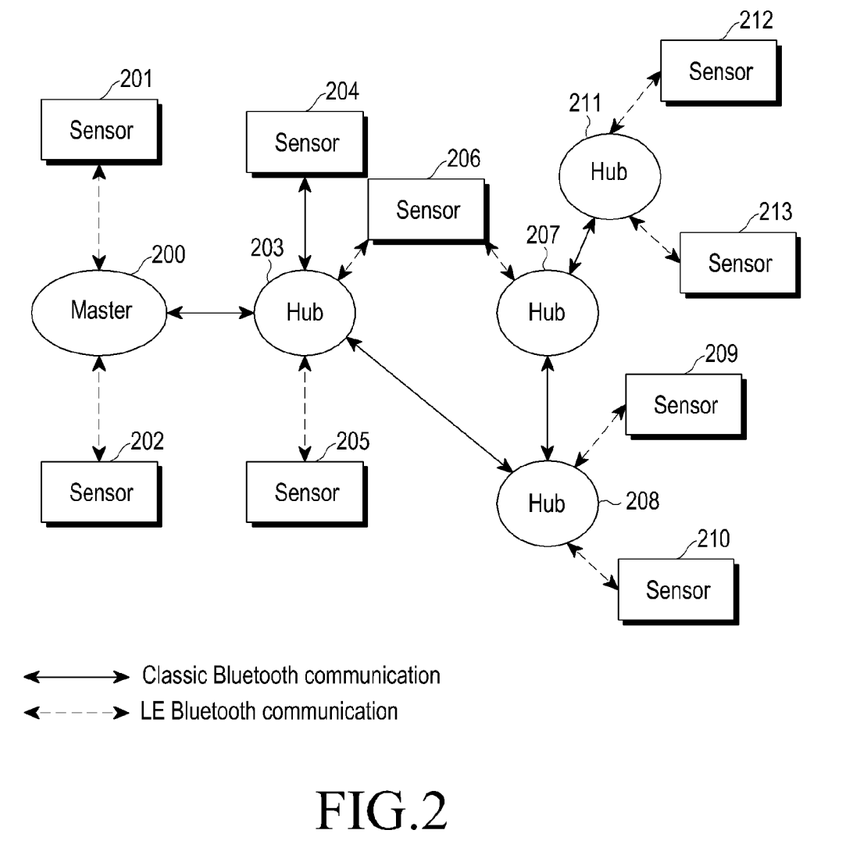
FIG. 2 illustrates a Home Area Network (HAN) topology using, Bluetooth connectivity, according to embodiments as disclosed herein.

FIG. 2 illustrates a Home Area Network (HAN) topology using Bluetooth connectivity, according to embodiments as disclosed herein. As depicted in the figure, the HAN topology comprises an electrical grid 101 domestic network which can be dedicated to demand-side management (DSM), including energy efficiency and demand response. The topology extends the range of Bluetooth communication so as to be integrated and used with wider networks such as the electrical grid 101. The topology comprises a master 200, also called a CCU, which communicates with the plurality of hubs such as hub 203, hub 207, hub 208, hub 211, and a plurality of sensors such as sensor 201, sensor 202, sensor 204, sensor 205, sensor 206, sensor 209, sensor 210, sensor 212, and sensor 213.

These sensors can be attached to devices or equipment such as washing machines, vacuum cleaners, refrigerators, ovens, and so on, to sense and send relevant electric parameters during operation of these devices to the master 200. In an embodiment, multiple sensors can be connected to the master 200 as well as to each of hub 203, hub 207, hub 208, and hub 211. Master (i.e., CCU) 200 and the hubs can either be self powered or externally powered. All sensors are Bluetooth Low Energy (LE) devices that are attached to the devices. Master 200 and all hubs (hub 203, hub 207, hub 208, hub 211) are dual mode devices and communicate with each other bi-directionally. In an embodiment, the dual mode can be a classic Bluetooth mode used for high energy devices and a Low Energy (LE) Bluetooth mode while communicating with their respective sensors which are low energy devices. The LE Bluetooth communication between sensors and master 200 or sensors and their respective hub is bidirectional.

The master 200, which can be part of the energy management console, is connected to a Utility AMI (Advanced Metering Infrastructure) network and has the list of all the sensors and hubs spread across the network. In an embodiment, each sensor in the network has a 32 bit unique identification number dynamically assigned by master 200 during the home network step up. This unique identification number is used to identify each sensor attached to the device which provides additional security. Configuration of the network is initiated by master 200 with a pre-entered list of sensors, and any further communication between LE sensors is carried out using this unique identification number. The network may be configured by itself without any human intervention. A new sensor registers with master 200 to get added to the network; thereafter master 200 sends an invite command to all the hubs in the network to find the newly added sensor. In the same way, a sensor can be removed by deregistering with master 200. A sensor may not enter into network without registering with master 200, which makes the system more secure. Once the network is auto configured, sensors communicate to master 200 through hubs in periodic intervals using sensor data packets; in the same way, master 200 communicates with sensors using, master data packets. Sensors update their status to respective hubs and the hub reports the status of all reporting sensors to all immediate hubs in the network, indicating these sensors are active in the network.

As depicted in the figure, sensor 201 and sensor 202, which can be attached to devices or equipment whose electrical parameters are monitored, are connected with master 200 via bidirectional communication using LE Bluetooth mode.

Sensors 201, 202 are low energy devices which sense predefined parameters and retrieve data samples from the equipment under monitoring. Further sensors 201, 202 format these data samples to a Bluetooth low energy standard and send them to master 200 which processes and analyzes data for further actions to be taken.

Sensors follow the Bluetooth Low Energy Sensor Profile specification standard defined by the Bluetooth Special Interest Group (SIG). Bluetooth Sensor profiles for Bluetooth LE implementations have been developed using the Generic Attribute Protocol (GATT) based profile architecture designed to support low power and low cost device implementation. Data values used in these profiles are defined as characteristics associated with a Universally Unique Identifier (UUID) accessible through the Bluetooth SIG Assigned Numbers.

A hub 203 is also connected to the master 200 through bidirectional communication using classic Bluetooth mode. Hubs are dual mode Bluetooth devices which are used for range extension. Hub 203 is connected with a plurality of hubs such as hub 208 and hub 207, and intercommunication with them is carried out by classic Bluetooth mode. The hub 203 is also connected with a plurality of sensors such as sensor 205, sensor 206, and sensor 204, which use LE Bluetooth mode for intercommunication. Hub 203 maintains the list of sensors which are paired to it. Hub 203 polls each sensor at regular intervals, as requested by master 200, and if any device leaves from its range, this information is communicated to the master 200 with a sensor lost command. Hubs play a major role in auto configuring the network and retransmitting the request over the network. In an embodiment, each packet sent by master 200 has a 4 byte packet ID. Hub 203 may neglect any packets which have been already forwarded to the next level. All hubs may format the responses from sensors with the same packet ID as used in the request sent by master 200. Notification is formatted with a packet ID of zero which may not be used by master 200 for any request.

Further, hub 207 is connected with a plurality of hubs such as hub 208 and hub 211 with bidirectional classic Bluetooth mode. Hub 207 is connected with sensor 206 with bidirectional LE Bluetooth mode. Hub 211 is further connected to sensors 212, 213, and hub 208 is connected to sensors 209, 210 using bidirectional LE Bluetooth mode. The complete network is centrally monitored and controlled by master 200. Master 200 provides an extended range by having hubs installed in multiple preset locations. By providing a plurality of hubs in the network range, the system offers increased reliability of the network in case of power down of one or more hubs, as packets can be rerouted to the destination.

Figure 3:
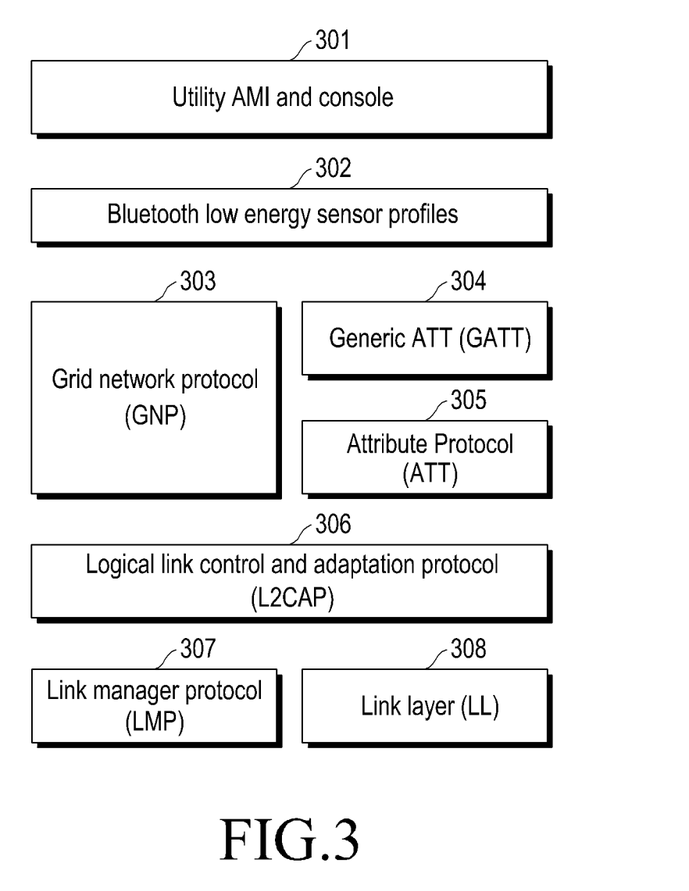
FIG. 3 illustrates a relationship of grid network protocol in a Central Control Unit (CCU) Bluetooth stack, according to embodiments as disclosed herein.

FIG. 3 illustrates a relationship of a grid network protocol in a Central Control Unit (CCU) Bluetooth stack, according to embodiments as disclosed herein. The figure depicts a standard Bluetooth stack implemented in the CCU (i.e., master) 200 for Bluetooth communication with the electrical grid 100 which comprises utility AMI and console 301 which enables monitoring and managing of energy meters. The CCU 200 communicates with Bluetooth low energy sensor profiles 302 through the Grid Network Protocol (GNP) 303. The CCU 200 uses the Bluetooth protocol stack, which is specified as several separate layers. The lowest level of the protocol stack is the physical layer, which serves to implement the physical communications interface, including RF aspects such as the modulation. Above the physical layer is the baseband layer, which serves to implement the timing, sequence and order of transmission of physical bits across the wireless bit-pipe from one Bluetooth device to another, including channel coding. The Bluetooth stack comprises Generic Attribute protocol (GATT) 304 and Attribute protocol (ATT) 305. The GATT 304 dictates how ATT 305 is employed in service composition. Every Low Energy profile is based on GATT 304, hence every LE service uses ATT as the application protocol.

Logical link control and adaptation protocol (L2CAP) 306 is used within the Bluetooth protocol stack. It passes packets to either the Host Controller Interface (HCI) or on a hostless system, directly to the Link Manager/ACL link. The L2CAP's functions include multiplexing data between different higher layer protocols, segmentation and reassembly of packets, providing one-way transmission management of multicast data to a group of other Bluetooth devices and Quality of service (QoS) management for higher layer protocols.

The Link Manager (LM or LMP) 307 is the next layer in the CCU's Bluetooth stack, which manages the behavior of the wireless link on a real time basis, controlling the baseband device and serving to allow service discovery and thereby to establish communication between two Bluetooth devices as they come in communication range of each other. The inter-Link Layer (LL) 308 provides an interface between the logical link control and adaptation protocol (L2CAP) 306 and the baseband drivers. LL 308 provides ultra-low power idle mode operation, simple device discovery, and reliable point-to-multipoint data transfer with advanced power-save and encryption functionalities.

Figure 4:
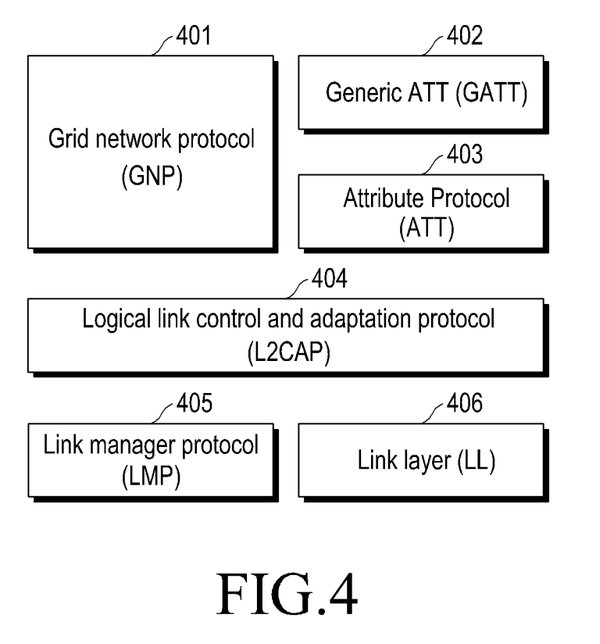
FIG. 4 illustrates a relationship of grid network protocol in a hub's Bluetooth stack, according to embodiments as disclosed herein.

FIG. 4 illustrates a relationship of grid network protocol in a hub's Bluetooth stack, according to embodiments as disclosed herein. The figure depicts the hub's Bluetooth stack used to communicate with the other hubs and CCU. The first layer in the Bluetooth stack is the grid network protocol (GNP) 401 with bridges to the other layers in the stack. The hub's Bluetooth stack comprises Generic Attribute protocol (GATT) 402 and Attribute protocol (ATT) 403. The GATT 402 dictates how ATT 403 is employed in service composition. Every Low Energy profile is based on GATT 402 hence every LE service uses ATT as the application protocol.

Logical link control and adaptation protocol (L2CAP) 404 is used within the Bluetooth protocol stack. The Link Manager (LM or LMP) 405 is the next layer in the hub's Bluetooth stack, which manages the behavior of the wireless link on a real time basis, controlling the baseband device and serving to allow service discovery and thereby to establish communication between two Bluetooth devices as they come in communication range of each other. The inter-Link Layer (LL) 406 provides an interface between the logical link control and adaptation protocol (L2CAP) 404 and the baseband drivers. LL 406 provides ultra-low power idle mode operation, simple device discovery and reliable point-to-multipoint data transfer with advanced power-save and encryption functionalities.

Figure 5:
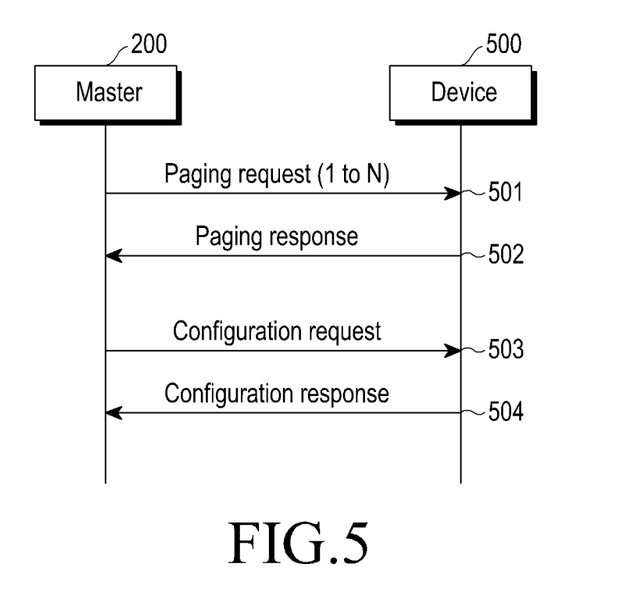
FIG. 5 illustrates a sequence diagram of a Central Control Unit (CCU) paging sequence, according to embodiments as disclosed herein.

FIG. 5 illustrates a sequence diagram of a Central Control Unit (CCU) paging sequence, according to embodiments as disclosed herein. As depicted in the figure, master 200 performs paging to detect and identify devices in its own network range and assign them a unique device Identifier (ID) to configure the network. The device 500 can be equipped with a low energy sensor that senses relevant electrical parameters and routes the data to master 200, which centrally processes and analyzes data received from devices. This communication is bidirectional and uses LE Bluetooth mode. In an embodiment, a plurality of Bluetooth devices can be in the range of master 200 and all these devices can be paged during network configuration.

Connecting Bluetooth devices is the process of creating a communication session between devices. In order to establish a new connection, the inquiry and paging procedures are used. The inquiry procedure enables a master 200 to discover which devices are in range, addresses, and clocks. With the paging procedure, an actual connection can be established. Creating a connection between Bluetooth devices starts by getting the attention of a device by paging it. For the Bluetooth system, a paging message contains its own device access code (DAC). The master 200 first sends (501) a paging request by transmitting many ID packets (Bluetooth address of the device) using the hopping sequence of the recipient device. When the receiving device 500 hears its ID address, the device 500 immediately responds (502) to this paging request to acknowledge the master 200. On receiving acknowledgement, the master 200 recognizes device 500 as a registered device in the network and sends (503) a configuration request to device 500 by pairing the device and assigning it a unique device ID. The device 500, upon receiving the configuration request from the master 200, then responds (504) with the configuration response. In order to provide improved security, all devices in the network may be kept as non discoverable mode to avoid being searched by other devices which are not part of the network.

Figure 6:
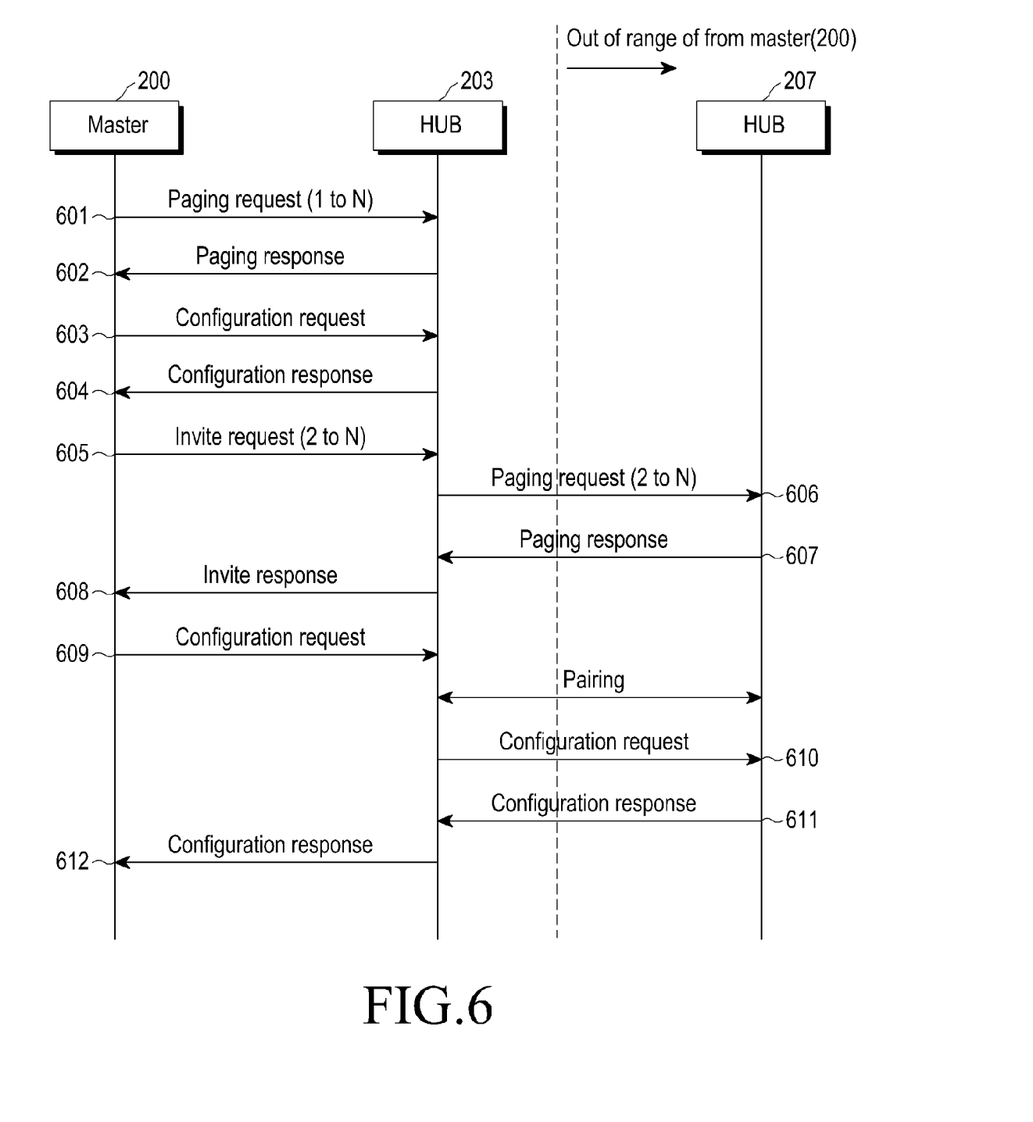
FIG. 6 illustrates a configuration sequence diagram of CCU and hubs, according to embodiments as disclosed herein.

FIG. 6 illustrates a configuration sequence diagram of CCU and hubs, according to embodiments as disclosed herein. As depicted in the figure, the master 200 sends (601) a request for paging to nearby hubs to search for 1 to N devices which were not detected during the master's paging sequence, as they could have been out of the range of master 200. The hub 203, on receiving the paging request from master 200, sends (602) a paging response comprising a list of devices found in the paging sequence. Then the master 200 sends (603) the configuration request to the hub 203 to configure the devices detected by hub 203. Upon receiving the configuration request, the hub 203 sends (604) a configuration response to the master 200. In an embodiment, if a hub is found in the network, then the master 200 sends the invite command with the list of Bluetooth address yet to be added to the network. The master 200 sends (605) the invite request to the hub 203. Then the hub 203 sends (606) the direction of the paging request to nearby hub 207 connected to the network. The hub 203 sends the direction of the paging request to hub 207 since it is out of range from the master 200. On receiving the paging request from the hub 203, the hub 207 sends (607) the paging response to the hub 203. Then the hub 203 sends (608) the invite response to the master 200.

In an embodiment, each hub responds to the CCU with the list of devices it could find in paging. Master 200 responds (609) to hub 203 with a configure command for each device in the response list, which registers a unique ID along with the Bluetooth address in the hub's list. Then the hub 203 gets paired with the hub 207. Then the hub 203 sends (610) the configuration request to hub 207 that it received from the master 200. Further, the hub 207 sends (611) the configuration response to the hub 203. On receiving the configuration response from the hub 207, hub 203 sends (612) the configuration response to the master 200.

Figure 7:
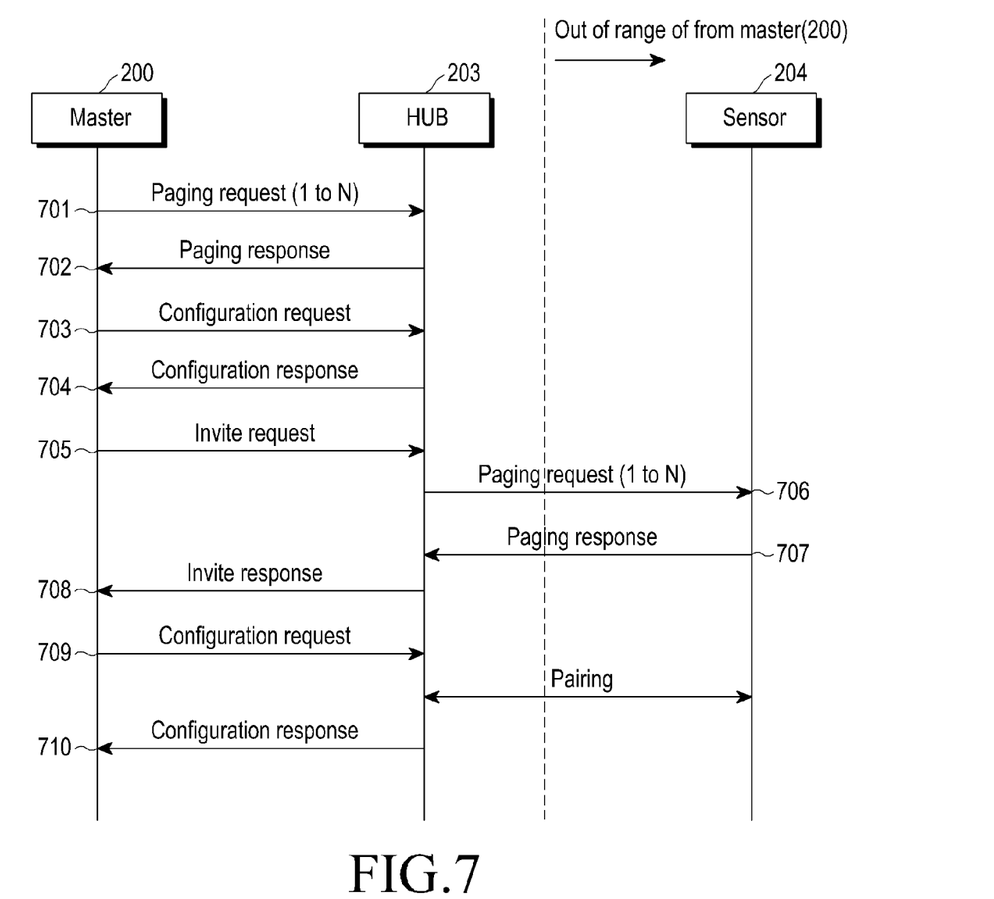
FIG. 7 illustrates a configuration sequence diagram of sensors and CCU, according to embodiments as disclosed herein.

FIG. 7 illustrates a configuration sequence diagram of sensors and CCU, according to embodiments as disclosed herein. As depicted in the figure, the master 200 sends (701) a request for paging to N nearby hubs. Then the hub 203 in the network sends (702) the paging response to the master 200. Then the master 200 sends (703) the configuration request to the hub 203 to configure the devices connected with the hub 203. Then the hub 203 sends (704) the configuration response to the master 200. On receiving, the configuration response from hub 203, the master 200 sends (705) the invite request to the hub 203. Further, the hub 203 sends (706) the direction of the paging request to N number of sensors connected with the hub 203. Then sensor 204 connected with the hub 203 sends (707) the paging response to the hub 203. Further, the hub 203 sends (708) the invite response to the master 200. Then the master 200 sends (709) the configuration request to the hub 203 to configure sensor 204 connected with hub 203. Upon receiving the configuration request from the master 200, the hub 203 pairs the sensor 204. Finally, the hub 203 sends (710) the configuration response to the master 200. The sensor 204 mentioned above is out of range from the master 200.

In an embodiment, once the network is auto configured, sensors communicate to the CCU through hubs in periodic intervals using sensor data packets. The same way, the CCU communicates with sensors using CCU data packets. Sensor devices update their status to hubs. In the same way, each hub reports to all immediate hubs in the network to shows that it is active in the network. If a sensor is active as per the hubs list and not sending periodic reports and not responding to any request, it is assumed that the device is moved out of its range. If a device does not have a proper active state and is not responding, the hubs shall report it as device lost to the CCU. Device lost can be due to either the device battery being, low or its position been changed. The CCU issues an invite command with the address of the lost device to network. Hubs respond with device found command back to the CCU and update their device list. An invite command with no response is assumed as a device failure and is updated in the CCU's device list.

Each hub maintains a list of hubs from which it received a configure request. One hub may receive multiple configure requests. Hubs maintain the list of hubs via which it received the configure request in the order which it was received. Hubs use this list to route data to the CCU. Even if one route is down due to any reason, hubs may try an alternative path to sent data to the CCU.

Figure 8:
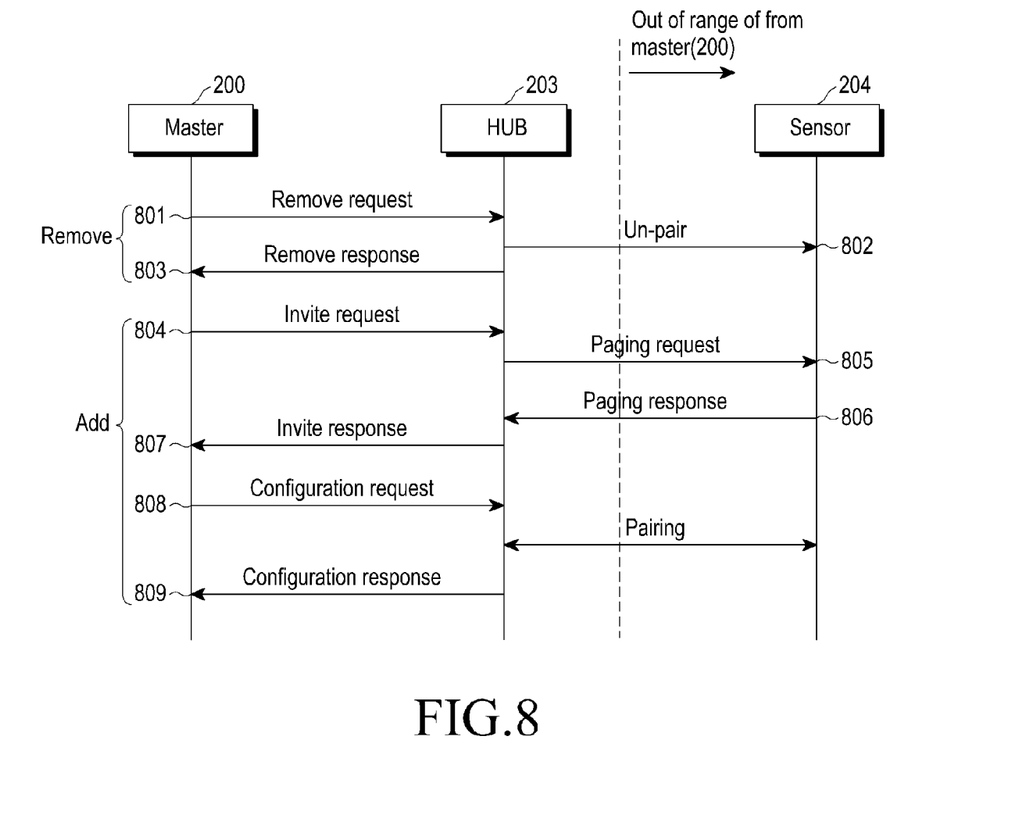
FIG. 8 illustrates a sequence diagram for updating the grid network, according to embodiments as disclosed herein.

FIG. 8 illustrates a sequence diagram for updating the network, according to embodiments as disclosed herein. The updating network procedure is usually used to update, remove, or add devices from or into the network. Master 200 can either determine on its own or as per network operator's instruction to remove or add a device. The removal of a device from the network is initiated by master 200 by sending (801) a remove request to the hub 203. Hub 203, on receiving a remove request, sends (802) an un-pair message to the sensor 204 which is out of range from the master 200. Then the hub 203, after un-pairing the sensor 204, updates its node list. Then the hub 203 sends (803) the remove response to the master 200.

In an embodiment, if the removal request is to remove another hub, then the operation may be carried out only when there are no devices attached to that hub. Hubs with one or more leaf nodes may respond with an error code and the list of devices attached to it. Master 200 determines whether to remove the hub. Then the master 200 removes the nodes attached to a hub and then removes the hub itself. Later, master 200 reconfigures the network to add the devices removed earlier, provided that those removed devices are in range of another hub.

To add a device, the master 200 sends (804) an invite request to the hub 203. On receiving the invite request the hub 203 sends (805) the direction of the paging request to the sensor 204. Then the sensor 204 sends (806) the paging response to the hub 203. Further, the hub 203 sends (807) the invite response to the master 200. Then on receiving the invite response, the master 200 sends (808) the configuration request to the hub 203 to configure the sensor 204 connected with the hub 203. Then the hub 203 pairs the sensor 204. Also, the hub 203, after pairing with the sensor 204, sends (809) the configuration response to the master 200. By this, the device attached with the sensor 204 is added to the network.

Figure 9:
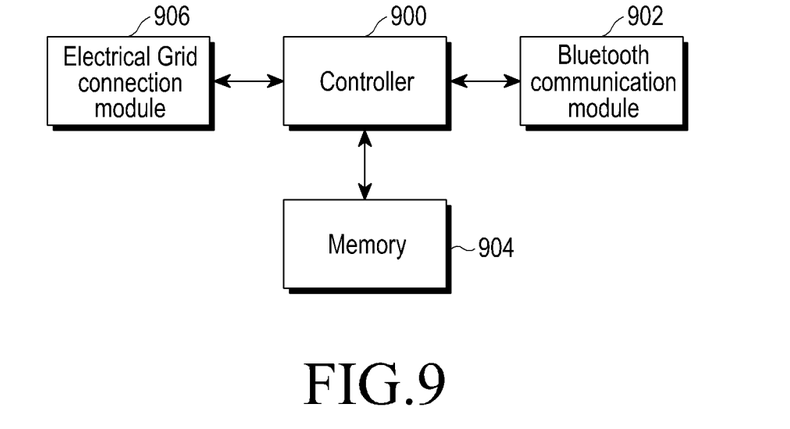
FIG. 9 illustrates a block diagram of the CCU according to embodiments as disclosed herein.

FIG. 9 illustrates a block diagram of a CCU according to the embodiments as disclosed herein. FIG. 9 shows an example of implementing a Bluetooth infrastructure network according to the embodiments of the disclosure in an electrical grid 101. Referring to FIG. 9, the CCU (master) 200 includes a controller 900, a Bluetooth communication module 902, a memory 904, and an electrical grid connect module 906. The Bluetooth communication module 902 provides bidirectional Bluetooth communication to at least one device and at least one hub for performing bidirectional Bluetooth communication with the at least one device in the network. The Bluetooth communication module 902 provides dual mode Bluetooth communication in which LE Bluetooth communication is performed for the at least one device, and classic Bluetooth communication is performed for the at least one hub. The controller 900 searches for at least one hub by paging, and searches for at least one device by paging through at least one detected hub, and configures the network. The memory 904 stores programs and data for the controller 900. The memory 904 stores at least one list relating to the hub, the device, and the sensor in the Bluetooth infrastructure network. The electrical grid connect module 906 provides a connect between the CCU 200 and the electrical grid 101.

Figure 10:
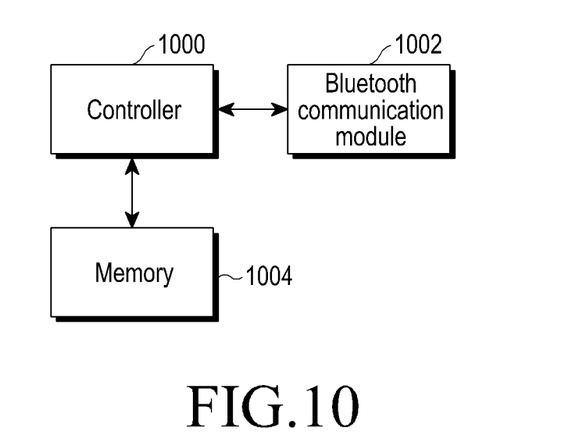
FIG. 10 illustrate a block diagram of a hub according to embodiments as disclosed herein.

FIG. 10 illustrates a block diagram of a hub according to the embodiments as disclosed herein. FIG. 10 shows an embodiment of each hub 203, 207, 208, or 211. Referring to FIG. 10, the hub includes a controller 1000, a Bluetooth communication module 1002, and a memory 1004. The Bluetooth communication module 1002 provides bidirectional Bluetooth communication to at least one device and a master 200 in a network. The Bluetooth communication module 1002 provides dual mode Bluetooth communication in which LE Bluetooth communication is performed for the at least one device, and classic Bluetooth communication is performed for the at least one hub. The controller 1000 searches for and pairs at least one device by paging according to a request of the master 200. The memory 1004 stores programs and data for the controller 1000. The memory 1004 stores at least one list relating to another hub, device, and sensor in the Bluetooth infrastructure network.

In an example implementation, a sensor is attached to a washing machine. The sensor is connected with a hub and the hub is connected with the CCU. The CCU is connected with the utility AMI which transmits the electrical parameters to the electrical grid 101. The electrical parameters can be current and voltage levels consumed by the washing machine. The sensor attached to the washing machine senses the electrical parameters and sends the same to the hub. The hub sends the parameters to the CCU. The utility AMI connected with the CCU sends the parameters to the electrical grid 101. This helps the electricity grid to identify the power consumed by the washing machine connected in the Bluetooth infrastructure. Similarly, multiple sensors can be attached to various home appliances and the electrical parameters of each device are sent to the electrical grid 101. The electrical grid 101, upon receiving the parameters, can identify the power consumed by the appliances in each home and based on that electrical grid generates the power. Currently, the power is generated irrespective of knowing the consumption of power by the appliances in each home. Now, with the implementation of this network, the power can be generated based on the power consumption in each home. This also helps in finding a home which consumes more power than the rated value and steps can be taken to reduce power consumption.

Even though the embodiments above disclose implementation of the Bluetooth based infrastructure for smart grids, this serves as a mere exemplary implementation. It may be obvious to a person of ordinary skill in the art to extend the embodiments herein to any electrical grid. It is obvious to a person skilled in the art that the embodiments as disclosed herein may be implemented in an arbitrary infrastructure network.

The embodiments disclosed herein can be implemented through at least one software program running on at least one hardware device and performing network management functions to control the elements. The elements shown in FIGS. 1, 2, 9 and 10 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A network to provide Bluetooth infrastructure, the network comprising:
   at least one Bluetooth-enabled device configured to perform bidirectional Bluetooth communication;
   a master connected with the at least one device by the bidirectional Bluetooth communication; and
   at least one hub device connected between the at least one Bluetooth-enabled device and the master device by the bidirectional Bluetooth communication, wherein the master device and the at least one hub device are each a dual mode Bluetooth device, wherein the at least one Bluetooth-enable device is a low-energy (LE) Bluetooth device, wherein the master device and the at least one hub device are connected with each other in a classic Bluetooth mode, and wherein the at least one hub device and the least one Bluetooth-enable device are connected with each other in a LE Bluetooth mode.

2. The network of claim 1, wherein the master device is configured to handle dynamic movement of the at least one Bluetooth-enabled device across the network.

3. The network of claim 1, wherein the master device is configured to maintain the at least one Bluetooth-enabled device in a non-discoverable mode.

4. The network of claim 1, wherein the master device is configured to auto configure the network based on at least one of adding or removing the at least one Bluetooth-enabled device.

5. A master device of a network to provide a Bluetooth infrastructure, the master device comprising:
   a Bluetooth communication module configured to provide bidirectional Bluetooth communication to at least one other device;
   at least one hub device configured to perform bidirectional Bluetooth communication with the at least one other device in the network; and
   a controller configured to:
      search for the at least one hub by paging,
      search for the at least one other device by paging through the at least one detected hub device, and
      configure the network, wherein the master device and the at least one hub device are each dual mode Bluetooth device, wherein the at least one other device is a low-energy (LE) Bluetooth device, wherein the dual mode Bluetooth device of the master device is configured to connect with the at least one hub device in a classic Bluetooth mode, and wherein the dual mode Bluetooth device of the master device is configured to connect with the at least one other device in a LE Bluetooth mode.

6. The master as device of claim 5, wherein the master device is configured to assign a unique identification number to the at least one other device and communicate with the at least one other device using the unique identification number in the network.

7. The master device of claim 6, wherein the master device is configured to assign the unique identification number dynamically during the network setup.

8. The master device of claim 5, wherein the master device is configured to communicate with the at least one other device by retrieving data from at least one sensor attached to the at least one other device.

9. The master device of claim 5, wherein the master device is configured to update the network when at least one of adding or removing the at least one other device in the network.

10. A hub device of a network to provide a Bluetooth infrastructure, the hub device comprising:
    a Bluetooth communication module configured to provide bidirectional Bluetooth communication to at least one other device in the network and a master device of the network; and
    a controller configured to search for and pair the at least one other device by paging according to a request of the master device, wherein the master device and the hub device are each a dual mode Bluetooth device, wherein the at least one other device is a low-energy (LE) Bluetooth device, wherein the dual mode Bluetooth device of the hub device is configured to Connect with the master device in a classic Bluetooth mode, and wherein the dual mode Bluetooth device of the hub device is configured to connect with the least one other device in a low-energy (LE) Bluetooth mode.

11. A method to provide a Bluetooth infrastructure using a master device of a network, the method comprising:
    searching for at least one hub device configured to perform bidirectional Bluetooth communication with at least one other device in the network by paging; and
    searching for the at least one other device by paging through the at least one detected hub device and configured to network, wherein the master device and the at least one hub device are each a dual mode Bluetooth device, wherein the at least one other device is a low-energy (LE) Bluetooth device, wherein the master device and the at least one hub device are configured to connect with each other in a classic Bluetooth mode, and wherein the at least one hub device and the at least one other device are configured to connect with each other in a low-energy (LE) Bluetooth mode.

12. The method of claim 11, further comprising:
    handling dynamic movement of the at least one other device across the network.

13. The method of claim 11, further comprising:
    maintaining the at least one other device in a non-discoverable mode.

14. The method of claim 11, further comprising:
    assigning a unique identification number to the at least one other device, and communicating with the at least one other device using the unique identification number in the network.

15. The method of claim 14, further comprising:
    dynamically assigning the unique identification number during a network set up.

16. The method of claim 11, further comprising:
    communicating with the at least one other device by retrieving data from at least one sensor attached to the at least one other device.

17. The method of claim 11, further comprising:
updating the network when at least one of adding or removing the at least one other device in the network.

* * * * *